United States Patent [19]
Swanson

[11] Patent Number: 5,421,028
[45] Date of Patent: May 30, 1995

[54] PROCESSING COMMANDS AND DATA IN A COMMON PIPELINE PATH IN A HIGH-SPEED COMPUTER GRAPHICS SYSTEM

[75] Inventor: Roger W. Swanson, Fort Collins, Colo.

[73] Assignee: Hewlett-Packard Company, Palo Alto, Calif.

[21] Appl. No.: 221,271

[22] Filed: Mar. 31, 1994

Related U.S. Application Data

[63] Continuation of Ser. No. 670,081, Mar. 15, 1991, abandoned.

[51] Int. Cl.⁶ .............................................. G06T 1/20
[52] U.S. Cl. .................... 395/800; 395/163; 395/650; 395/775; 395/375; 364/DIG. 1; 364/231.8
[58] Field of Search ............... 395/163, 375, 650, 775, 395/800

[56] References Cited

U.S. PATENT DOCUMENTS

| | | | |
|---|---|---|---|
| 4,398,176 | 8/1983 | Dargel et al. | 382/27 |
| 4,791,569 | 12/1988 | Suzuki | 364/431.04 |
| 4,794,517 | 12/1988 | Jones et al. | 364/200 |
| 4,837,676 | 6/1989 | Rosman | 364/200 |
| 4,841,436 | 6/1989 | Asano et al. | 364/200 |
| 4,967,340 | 10/1990 | Dawes | 364/200 |
| 4,996,661 | 2/1991 | Cox et al. | 364/748 |
| 5,053,987 | 10/1991 | Genusov et al. | 364/736 |
| 5,138,615 | 8/1992 | Lamport et al. | 370/94.3 |

OTHER PUBLICATIONS

Rhoden et al., "Hardware Acceleration for Window Systems", *Computer Graphics*, vol. 23, No. 3, Jul. 1989.

*Primary Examiner*—Ken S. Kim

[57] ABSTRACT

A pipelined processing system in which context switching for each of the pipelined processing circuits within the pipeline may be accomplished without flushing the data from the pipeline. This is accomplished by sending the pipeline commands and data together through the pipeline and differentiating the commands from the data using a flag added to the commands and data which specifies whether the associated data word is a command or data. During operation of the pipeline, when the input data is received by one of the pipelined processing circuits in the pipeline, the flag is checked to see if the associated data word includes a command. If the associated data word includes data to be processed, it is processed in accordance with the current configuration of the pipeline. However, if the associated data word includes a command for setup and control and the like, each pipelined processing circuit within the pipeline compares its identification value with a tag field in the command to determine whether it is to be reconfigured by that command. If it is to be reconfigured by that command, the appropriate context switching and the like takes place. However, if the current pipelined processing circuit is not to be reconfigured by that command, that command is passed through the current pipelined processing circuit unprocessed so that a similar determination may be made by the next pipelined processing circuit in the pipeline. As a result, setup and control commands for the pipelined processing circuits may be passed through the data processing pipeline along with the data in the desired processing order such that a pipeline data flush is not necessary between reconfigurations of the pipelined processing circuits. Since the pipeline need not be flushed when processes are changed, processing efficiency and throughput are substantially improved.

11 Claims, 2 Drawing Sheets

PROCESSING COMMANDS AND DATA IN A COMMON PIPELINE PATH IN A HIGH-SPEED COMPUTER GRAPHICS SYSTEM

CROSS REFERENCE TO RELATED APPLICATION

This is a continuation of application Ser. No. 07/670,081 filed on Mar. 15, 1991, now abandoned.

BACKGROUND OF THE INVENTION

1. Field of the Invention

The present invention relates to a technique for pipelining commands along with data in a computer graphics system, and more particularly, to a system whereby setup and control commands for pipelined processing circuits are passed into the pipeline along with the data and processed in the desired processing order such that a pipeline data flush is not necessary between reconfigurations of the pipelined processing circuits.

2. Description of the Prior Art

Pipelining is an implementation technique in which multiple instructions are simultaneously overlapped in execution. Each step in the pipeline completes a part of the instruction, for the work to be done in an instruction is broken into smaller pieces, each of which takes a fraction of the time to process as the entire instruction. Each of these steps is called a pipe stage or a pipe segment and is referred to herein as a "pipelined processing circuit." The pipelined processing circuits are connected one to the next to form a pipeline in which the instructions enter at one end, are processed through the respective pipelined processing circuits, and exit at the other end. As known to those skilled in the art, if the pipelined processing circuits process the data at approximately the same speed, the speedup from pipelining approaches the number of pipe stages.

Pipelining exploits parallelism among the instructions in a sequential instruction stream to achieve this processing speed improvement. Since computer graphics instructions are highly parallel, they are ideally suited for pipelining. Pipelining is thus widely used in computer graphics systems to perform the substantial processing on input data which is necessary in order to render the desired image to the display screen.

FIG. 1 illustrates a simplified prior art graphics pipeline 100 for processing primitives and context data received by a graphics transform engine 102 for manipulation. As known to those skilled in the art, graphics transform engine 102 typically converts its input data to screen coordinates and performs the desired manipulations on the data. For example, graphics transform engine 102 may perform tasks such as graphics context management, matrix transformation calculations, spline tessellation, and lighting model computations. The graphics transform engine 102 also controls vector and polygon rendering hardware. The data processed by graphics transform engine 102 is output to a random access memory (RAM) 104 which typically comprises a first-in-first-out buffer. Graphics processing commands output by graphics transform engine 102, on the other hand, are sent via a control path to each of the subsequent pipelined processing circuits to handle setup and control for context switching and the like. The processed data stored in RAM 104 is then passed to a pixel processor 106 which performs functions such as Z interpolation, color and transparency interpolation and the like. The output of pixel processor 106 is then passed to a post processor 108 which performs functions such as gamma correction, dithering, window management and the like. The output of the post processor 108 is then output to a pixel cache 110 for further manipulation before storage in a frame buffer 112 for display. Such a graphics pipeline improves data processing efficiency in that each pipelined processing circuit operates on its data at the same time the other processing circuits operate on their data for a particular input instruction.

However, the processing efficiency of graphics pipelines is significantly limited by the problem of context switching graphics hardware between processes. As known by those skilled in the art, context switching occurs when subsequent instructions require the pipelined processing circuits to be reconfigured to process the latter instruction. For example, the transform engine 102 may be instructed to represent subsequent data as anti-aliased vectors. This instruction and the associated data are passed through the graphics pipeline 100 and processed by each of the processing circuits 102–110 before being stored in the frame buffer 112. Then, if the instruction received immediately after the instruction to draw the anti-aliased vectors is a different type of instruction, such as a draw and shade polygon instruction, each of the processing circuits 102–110 must be reconfigured to perform the appropriate operation on the data following the draw and shade polygon instruction. This is typically accomplished by context switching the graphics hardware between such instructions.

As shown in FIG. 1, the context switching of the graphics hardware within the pipeline 100 previously has been conducted via a separate control line routed to each of the pipelined processing circuits separate from the data in the pipeline. Instructions are sent via this control line to plug the pipeline 100 and to instruct each of the pipelined processing circuits to complete processing of the data currently in the pipeline. Once all the data in the pipeline has been processed, the pipelined processing circuits are reconfigured by switching the contexts to those for the next instruction and then resynchronizing the pipelined processing circuits when processing of the next instruction is to start.

Context switching graphics hardware between instructions in this manner has had a significantly adverse effect on processing efficiency because, as just described, the data associated with the first instruction must be completely passed through the pipeline before the contexts of the pipelined processing circuits are switched to accommodate the subsequent instruction. In other words, the pipeline is "plugged up" until the data for the previous instruction has completely propagated through the pipeline (a so-called "pipeline flush"). The time required for a single primitive to traverse the pipeline is called the pipeline latency, and this latency determines the duration of the pipeline flush. Such pipeline latency encountered during a pipeline flush removes the responsiveness and interactivity of the graphics system, and as input graphics primitives become more complex and the pipelines become longer, the pipeline latency problem grows. Moreover, since the current trend of graphics pipelines is towards higher level, more complex primitives which require more processing time in the pipeline, the penalty for a pipeline flush has become unacceptable if the computer graphics system is to function at high speeds. An alternative to pipeline flushing and resynchronization has thus become necessary for good system performance.

Hardware solutions have been proposed for minimizing the effect of pipeline latency by eliminating the need for pipeline flushing and resynchronization without interrupting the flow of commands to the pipeline. For example, a technique is described in a paper by Rhoden et al. entitled "Hardware Acceleration for Window Systems", *Computer Graphics*, Vol. 23, No. 3, July 1989, in which a separate path or pipeline "bypass" is provided for window primitives that do not require the pipeline. The pipeline bypass allows the window system direct access to various components of the pipeline, including the frame buffer. The philosophy behind such a pipeline bypass is that window systems often require fast access for operations that are comparatively simple. By offering a bypass, the overhead of the graphics pipeline is avoided while providing the simple services required by the window system. The net result is a system which provides good window system interaction even in the middle of a complex rendering operation.

Synchronization of the pipeline bypass is provided using a pipeline valve which provides explicit control over pipeline access to the frame buffer. The pipeline valve turns off data coming from the rendering hardware into the frame buffer, and when the pipeline output is stopped, the window system is free to access the frame buffer. However, the pipeline valve does not stop the transform engines, which continue to process primitives until the entire pipeline backs up. Thus, significant processing may proceed before the pipeline fills up. Then, while the pipeline valve is closed, the window system may move, resize or otherwise manipulate the windows on the display screen without regard to the contents of the pipeline. When the pipeline valve is opened, rendering will continue to the modified window structure. By providing primitives which are window relative, the primitives being rendered will appear in the correct location. Also, since it is unnecessary to stop the pipeline or prevent processes from continuing to place commands and data into the pipeline as result of this configuration, the window translation is completely transparent to the application.

Unfortunately, the processing improvements possible in accordance with the techniques of Rhoden et al. are primarily limited to window rendering. It is desired to improve such an approach so as to allow global variables within the pipeline to be changed for processing of subsequent instructions without stopping up or flushing of the pipeline, thereby preventing the loss of the many processing cycles typically used for a pipeline flush. However, such a technique must still maintain the input processes in the correct order so that the data is appropriately processed for rendering to the display screen. The present invention has been designed to meet these needs.

SUMMARY OF THE INVENTION

The above-mentioned needs in the art have been met in accordance with the present invention by developing a technique whereby the processing commands and the data are inserted into the pipeline together and the processing commands propagated through the pipeline with the data until the commands reach the pipelined processing circuit which must be reconfigured for that command to be processed. The reconfiguration then takes place without stopping up of the pipeline. In other words, commands including setup and other information specific to a downstream processing block are propagated through the pipeline until they reach a pipelined processing circuit which must be reconfigured to execute the corresponding process. Preferably, the command and data are sent together through the pipeline as data blocks having a flag which indicates whether its associated data block contains a command or data. Each data block having a command further includes address information identifying the pipelined processing circuits which must be reconfigured by that command. Such a technique allows automatic sequencing of input instructions and more independent operation of each pipelined processing circuit. Moreover, since the pipeline need not be flushed between reconfigurations of the pipeline, faster pipeline processing is possible.

In particular, a pipelined processing system for sequentially processing a plurality of commands without flushing the pipeline between reconfigurations of the pipelined processing circuits is provided in accordance with the invention. Although the invention may be applied to any pipelined processing system, in a preferred embodiment the invention is used in a graphics pipeline. Such a preferred embodiment of a pipelined processing system preferably comprises a data processing pipeline having two or more pipelined processing circuits which perform predetermined functions on inputs thereto. Also, means are provided which supply data blocks having a predetermined number of bits to the pipelined processing circuits. Each such data block preferably includes means for indicating whether that block contains data or a processing command. In addition, each data block containing a processing command further comprises identifying means for identifying whether a particular pipelined processing circuit is to process that command. As a result, setup and control commands for the pipelined processing circuits may be passed in the data processing pipeline with the data in the desired processing order such that a pipeline data flush is not necessary between reconfigurations of the pipelined processing circuits.

In preferred embodiments of the invention, the pipelined processing circuits check the indicating means in each data block received at an input thereof to determine if the present data block contains data or a data processing command. If the present data block contains a data processing command, the at current pipelined processing circuit further checks the identifying means to determine if a data processing command of the present data block is to be processed by that pipelined processing circuit. Preferably, the current pipelined processing circuit passes through unprocessed those data processing commands which the identifying means indicates are not to be processed by that pipelined processing circuit. In addition, the pipelined processing circuit preferably has an identification value and the identifying means has a tag field containing a tag which is compared to the identification value to determine whether that pipelined processing circuit is to be reconfigured for further processing of the following data.

The scope of the invention also includes a method of sequentially processing a plurality of commands in a data processing pipeline having two or more pipelined processing circuits. Such a method in accordance with the invention preferably comprises the steps of:

inputting data blocks having a predetermined number of bits to a first of the pipelined processing circuits; and for each pipelined processing circuit of the data processing pipeline, performing the steps of:

determining whether an input data block contains data or a processing command and, if the input data block contains a processing command, further determining whether the current pipelined processing circuit is to process that command, and if the current pipelined processing circuit is to process the command in the input data block, processing that command and passing the results to the next pipelined processing circuit in the data processing pipeline, but if the current pipelined processing circuit is not to process the command in the input data block, passing the input data block through the current pipelined processing circuit along with the data, without processing, to the next pipelined processing circuit in the data processing pipeline.

Preferably, setup and control commands for the pipelined processing circuits may be passed in the data processing pipeline along with the data in the desired processing order such that a pipeline data flush is not necessary between reconfigurations of the pipelined processing circuit.

BRIEF DESCRIPTION OF THE DRAWINGS

These and other objects and advantages of the invention will become more apparent and more readily appreciated from the following detailed description of the presently preferred exemplary embodiment of the invention, taken in conjunction with the accompany drawings, of which.

DETAILED DESCRIPTION OF THE PRESENTLY PREFERRED EMBODIMENT

A device with the above-mentioned and other beneficial features in accordance with a presently preferred exemplary embodiment of the invention will be described below with reference to FIGS. 2 and 3. Although the invention is described herein in conjunction with a graphics processing system, where the serial data stream comprises pipelined graphics data and primitives, it will be appreciated by those of ordinary skill in the art that the principles of the invention may be applied in various other processing environments as well. Moreover, those skilled in the art will appreciate that the description given herein is for explanatory purposes only and is not intended in any way to limit the scope of the invention. All questions regarding the scope of the invention may be resolved by referring to the appended claims.

As just noted, the present invention will be described in the context of a graphics processing system as a presently preferred embodiment. Accordingly, the data blocks of the invention will typically include graphics commands and primitives which are grouped together in such a way as to constitute a graphics entity. The data blocks further may be formed into command/data packets which describe the attributes of the graphics entity. A description of such command/data packets can be found in related U.S. patent application Ser. Nos. 07/492,518 to Herrell et al., filed Mar. 12, 1990 and entitled "User Scheduled Direct Memory Access Using Virtual Addresses" and 07/494,008 to Herrell et al., filed Mar. 15, 1990 and entitled "User Scheduled Direct Memory Access Via Work Buffer Pointers". As used herein, an attribute is a description which specifies the context in which other data blocks are to be processed. An attribute of a graphics entity may include, for example, the texture, the colors RGB, the transparency $\alpha$ of the image and other features of the image known to those of ordinary skill in the art. In addition, context characteristics such as window size, background colors and foreground colors may also be considered to be attribute information for purposes of this application.

A general description of a preferred embodiment of the invention will now be given with respect to FIGS. 2 and 3.

Figure 1:
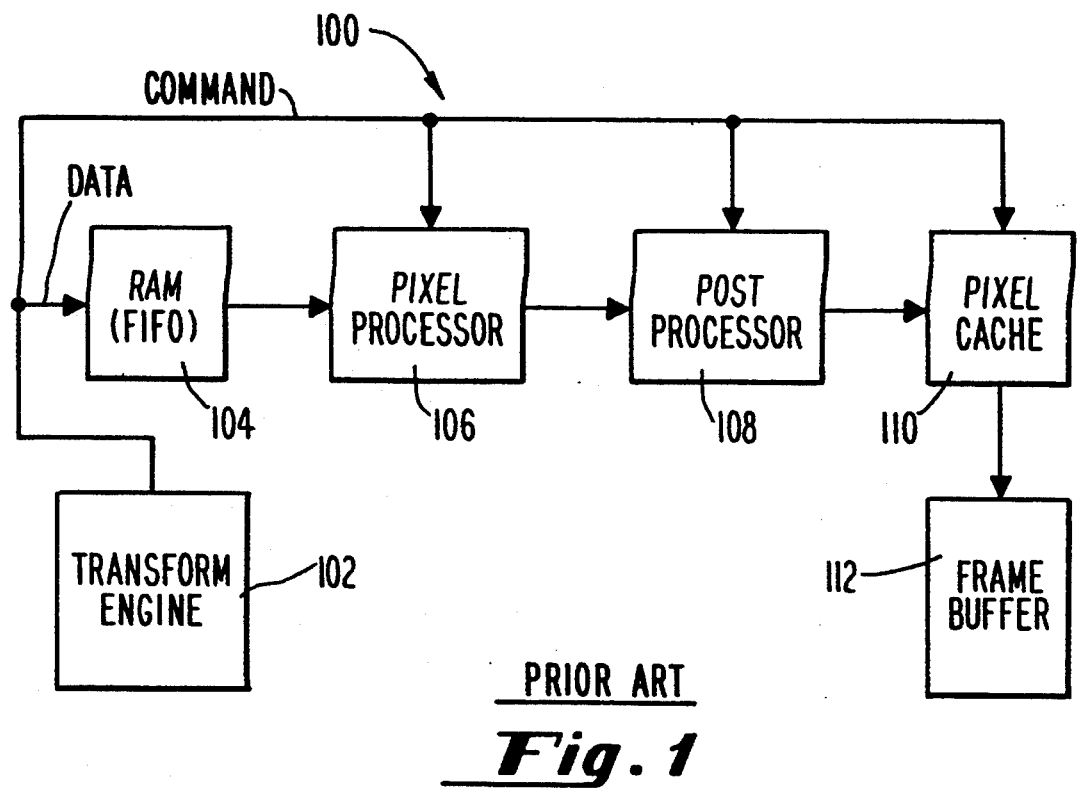
FIG. 1 schematically illustrates a prior art graphics pipeline in which the context switching between processes is performed via a separate control line.
Figure 2:
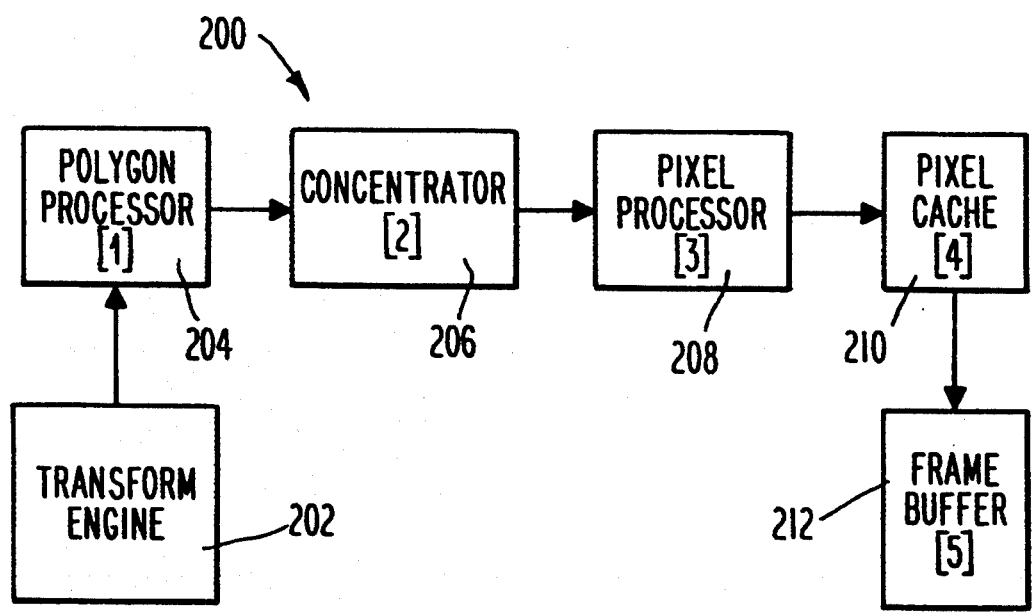
FIG. 2 schematically illustrates a graphics pipeline in accordance with the invention whereby the setup and control commands and data are sent together through the graphics pipeline so that the pipelined circuits may be reconfigured without a pipeline flush.

FIG. 2 schematically illustrates a graphics pipeline 200 in accordance with the invention wherein the graphics command and attribute data and primitives are sent through the pipeline together as data blocks. As used herein, a data block is typically a 32-bit word with a command/data flag attached thereto as will be described below. However, data blocks of other sizes may of course be used. As will also be described below, the commands in the data blocks include tag fields which hold tag data representing the identification value or address of one or more of the downstream processing devices within the pipeline which are to be reconfigured by that command. In other words, setup and control information for context switching and the like may be passed in the commands with the data down the pipeline and used to reconfigure the pipelined processing circuits identified in the command's tag field. In preferred embodiments, the tag field is compared to an identification value which is hardwired into registers of the respective pipelined processing circuits. However, one skilled in the art will further appreciate that the comparison of the identification value for each pipelined processing circuit with the tag may be implemented in software. The technique of the invention thus allows the commands to set up the pipeline for further processing through the pipeline without using a separate control path as in the prior art.

As shown in FIG. 2, the graphics commands and data are processed by transform engine 202 in a conventional manner and then provided to a graphics pipeline comprising polygon processor 204, concentrator 206, pixel processor 208, pixel cache 210 and frame buffer 212. Polygon processor 204 transforms vertex and slope data from the transform engine 202 into polygons or trapezoids before passing the resulting data downstream to concentrator 206. In preferred embodiments, a plurality of polygon processors 204 may be connected in parallel to improve processing speed. Concentrator 206 is preferably a circuit of the type described in related U.S. patent application Ser. No. 07/494,716 to Appel, filed Mar. 16, 1990 and entitled "Data Stream Concentrator Providing Attribute Data Storage and Graphics Pipeline Access", which merges command/data streams from a plurality of such parallel polygon processors 204 into a command/data pipeline stream having the same ordering in which the commands were received by parallel polygon processors 204. In addition, concentrator 206 may do setup and rendering functions of the type described in the aforementioned application. As shown, the output of concentrator 206 is input into pixel processor 208, which determines the values of the pixels within the polygons by performing interpolation functions and the like. The output of the pixel processor 208 is then passed through a pixel cache 210 for additional manipulation before storage in frame buffer 212.

Figure 3A:
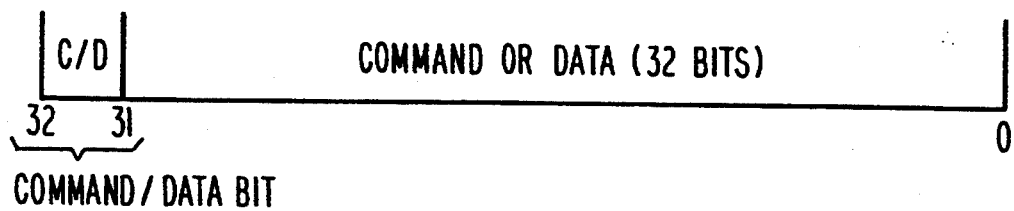
FIGS. 3(a), 3(b), and 3(c) each illustrate preferred formats of commands and the associated data input into the graphics pipeline of the invention.
Figure 3B:
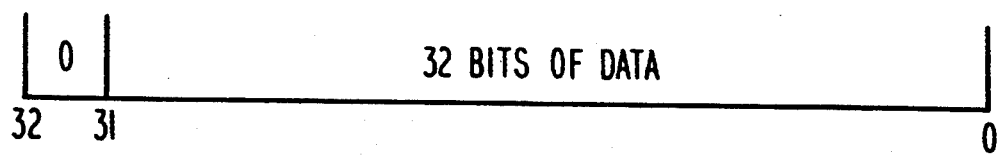
Figure 3C:
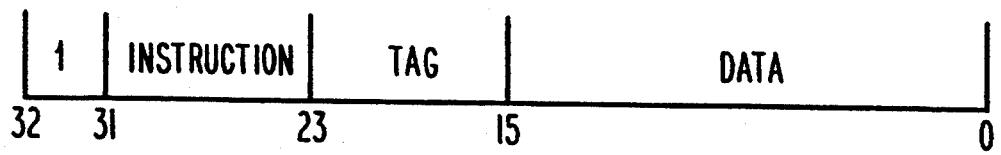

In accordance with a preferred embodiment of the invention, the data block input into the graphics pipeline 200 from transform engine 202 comprises a 32-bit data word and a command/data bit which indicates whether that data block includes a command or data, as shown in FIG. 3(a). Each data block thus comprises 33 bits, although those skilled in the art will appreciate that data blocks of other sizes may also be used. The command/data bit is thus a flag which may simply have a value of "0" if the associated 32 bits comprise graphics data, as shown in FIG. 3(b), while the command/data bit may have a value of "1" as shown in FIG. 3(c), if the associated 32 bits comprise a command. Of course, other flags may also be used. As noted above, such commands typically include setup and control commands for reconfiguring the pipeline by switching contexts and the like. As shown in FIG. 3(c), each such command preferably includes an 8-bit instruction and an 8-bit tag field which in accordance with the invention identifies which downstream processing circuits are to be reconfigured in order to process that command. Bits 0-15 may hold data or be unused.

Thus, as noted above, the command is propagated through the pipeline 200 until a downstream processing circuit having an identification value corresponding to the value stored in the tag field is reached. The commands thus float through the pipeline 200 until they reach the pipelined processing circuit which needs to be reconfigurated for the current command. The instruction is then processed so that the appropriate context switching and the like may be performed. This technique keeps the pipeline flowing so that the pipeline does not have to be flushed for context switching and the like. Accordingly, global variables for the pipeline may be changed without flushing the pipeline.

As shown in FIG. 2 by way of example, each processing circuit within the pipeline 200 has an identification value, which for ease of description is shown as a "1" for polygon processor 204, a "2" for concentrator 206, a "3" for pixel processor 208, a "4" for pixel cache 210 and a "5" for frame buffer 212. Each of these pipelined processing circuits includes an internal register 214 or a software process which, upon receipt of input data blocks, checks the command/data bit to determine whether the associated 32-bit word includes a command or data. If the command/data bit is "0" and hence the associated 32 bits are graphics data, that graphics data is processed in accordance with the present hardware configuration. However, if the command/data bit has a value of "1" indicating that the associated 32 bits represent a graphics command, the current pipelined processing circuits 204-212 compares its identification value with the tag value in the tag field of the command to determine whether it is to be reconfigured by that command. If there is a match, reconfiguration takes place in accordance with the new instruction and subsequent data is processed in accordance with the new hardware reconfiguration. This comparison of the identification value with the tag value in the tag field may take place in an internal register 214 of each pipelined processing circuit, where the identification value is hardwired into the internal register. On the other hand, these values may be compared via software, pin selections and the like. The above process is repeated by all processors within the graphics pipeline for all input data blocks received. If the identification values and tag values do not match, however, the current command is passed through unprocessed to the next pipelined processing circuit.

Thus, the present invention provides a technique for reconfiguring the graphics pipeline to accommodate new processes without flushing the pipeline. This results in improved performance which makes processing of even complex primitives through long pipelines quite efficient.

Although an exemplary embodiment of the invention has been described in detail above, those skilled in the art will readily appreciate that many additional modifications are possible in the exemplary embodiment without materially departing from the novel teachings and advantages of the invention. For example, the techniques in accordance with the invention may be applied to substantially different types of commands in other processing environments besides a graphics system as herein described. Of course, the command/data blocks may also be combined into command/data packets as described in the aforementioned related applications to Herrell et al. Moreover, implied flags may be used and the associated words may have variable bit lengths. Accordingly, all such modifications are intended to be included within the scope of this invention as defined in the following claims.

I claim:

1. A pipelined processing system for sequentially processing a plurality of data blocks including only system data or pipeline setup and control commands and associated setup and control data, comprising:

a data processing pipeline having at least two pipelined processing circuits which perform predetermined functions on data blocks input thereto, each pipelined processing circuit including means for reading predetermined bits of received data blocks and for processing system data and pipeline setup and control commands and associated setup and control data within read data block which said pipelined processing circuit is authorized to process; and means for providing data blocks having a predetermined number of bits to said data processing pipeline, each data block including means read by said reading means of each pipelined processing circuit for indicating whether that data block contains a pipeline setup and control command, each data block containing a pipeline setup and control command further comprising identifying means read by said reading means of each pipelined processing circuit for identifying whether said pipelined processing circuit is authorized to process that pipeline setup and control command, said providing means providing said pipeline setup and control commands in said data blocks in the desired order for processing by said pipelined processing circuits such that a pipeline data flush is not necessary between reconfigurations of said pipelined processing circuits.

2. A system as in claim 1, wherein each pipelined processing circuit checks said indicating means in each data block received at an input thereof to determine if the present data block contains data or a data processing command and, if the present data block contains a data processing command, said pipelined processing circuit checks said identifying means to determine if a data processing command of the present data block is to be processed by said pipelined processing circuit.

3. A system as in claim 2, wherein each pipelined processing circuit passes through unprocessed those data processing commands which said identifying means indicates are not to be processed by said pipelined processing circuit.

4. A system as in claim 1, wherein each pipelined processing circuit has an identification value and said identifying means comprises a tag field containing a tag value which is compared by said processing means of said pipelined processing circuit to said identification value to determine whether said pipelined processing circuit is to be reconfigured by a pipeline setup and control command for processing of subsequent system data.

5. A pipelined graphics processing system for sequentially processing a plurality of data blocks including only graphics data or pipeline setup and control commands and associated setup and control data, comprising:

a graphics pipeline having at least two pipelined processing circuits which perform predetermined functions on data blocks input thereto, each pipelined processing circuit including means for reading predetermined bits of received data blocks and for processing graphics data and pipeline setup and control commands and associated setup and control data within read data blocks which said pipelined processing circuit is authorized to process; and means for providing data blocks having a predetermined number of bits to said graphics pipeline, each data block including means read by said reading means of each pipelined processing circuit for indicating whether that data block contains a pipeline setup and control command, each data block containing a pipeline setup and control command further comprising identifying means read by said reading means of each pipelined processing circuit for identifying whether said pipelined processing circuit is authorized to process that pipeline setup and control command, said providing means providing said pipeline setup and control commands in said data blocks in the desired order for processing by said pipelined processing circuits such that a pipeline data flush is not necessary between reconfigurations of said pipelined processing circuits.

6. A system as in claim 5, wherein each pipelined processing circuit checks said indicating means in each data block received at an input thereof to determine if the present data block contains graphics data or a graphics data processing command and, if the present data block contains a graphics data processing command, said pipelined processing circuit checks said identifying means to determine if a graphics data processing command of the present data block is to be processed by said pipelined processing circuit.

7. A system as in claim 6, wherein each pipelined processing circuit passes through unprocessed those graphics data processing commands which said identifying means indicates are not to be processed by said pipelined processing circuit.

8. A system as in claim 5, wherein each pipelined processing circuit has an identification value and said identifying means comprises a tag field containing a tag which is compared by said processing means of said pipelined processing circuit to said identification value to determine whether said pipelined processing circuit is to be reconfigured for processing of subsequent graphics data.

9. A system as in claim 5, wherein said graphics pipeline includes a polygon processor, a pixel processor, a pixel cache and a frame buffer connected in series.

10. A method of sequentially processing a plurality of data blocks including only system data or pipeline setup and control commands and associated setup and control data in a data processing pipeline having at least two pipelined processing circuits which perform predetermined functions on data blocks input thereto, each pipelined processing circuit including means for reading predetermined bits of received data blocks and for processing system data and pipeline setup and control commands and associated setup and control data within read data blocks which said pipelined processing circuit is authorized to process, comprising the steps of:

inputting data blocks having a predetermined number of bits to a first of said pipelined processing circuits, said pipeline setup and control commands being provided in said data blocks in the desired order for processing by said pipelined processing circuits such that a pipeline data flush is not necessary between reconfigurations of said pipelined processing circuits; and for each pipelined processing circuit of said data processing pipeline, performing the steps of:
said reading means determining whether an input data block contains a pipeline setup and control command, and, if the input data block contains a pipeline setup and control command, further determining whether the current pipelined processing circuit is authorized to process that pipeline setup and control command, and if the current pipelined processing circuit is authorized to process the pipeline setup and control command in the input data block, said processing means of the current pipelined processing circuit processing that pipeline setup and control command and passing results of the processing of that pipeline setup and control command to the next pipelined processing circuit in the data processing pipeline, but if the current pipelined processing circuit is not authorized to process the pipeline setup and control command in the input data block, said processing means passing the input data block containing the pipeline setup and control command through the current pipelined processing circuit unprocessed to the next pipelined processing circuit in the data processing pipeline.

11. A method as in claim 10, wherein the step of determining whether the current pipelined processing circuit comparing an indentification value of the current pipelined processing circuit with a tag in a tag field in the input command.

* * * * *